Sept. 15, 1936.   C. STEDEFELD ET AL   2,054,716
ELECTROMAGNETIC RAIL BRAKE
Filed Nov. 9, 1932   2 Sheets-Sheet 1
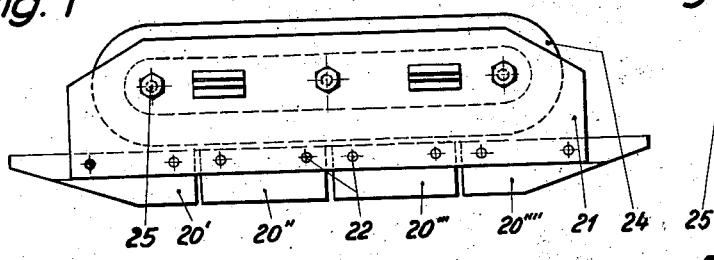
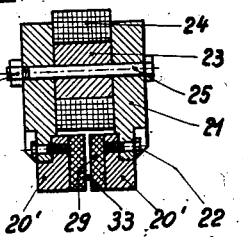
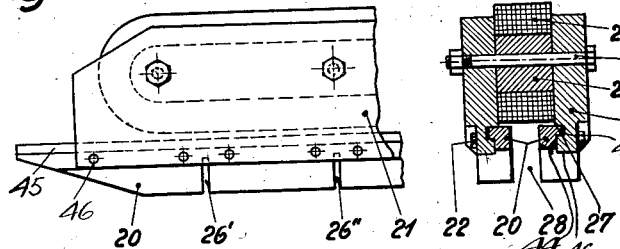
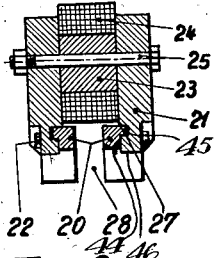
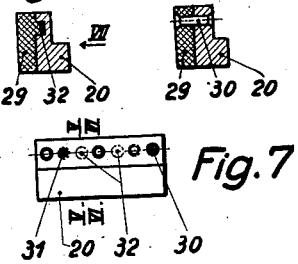
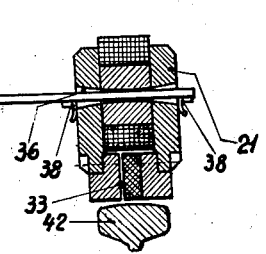
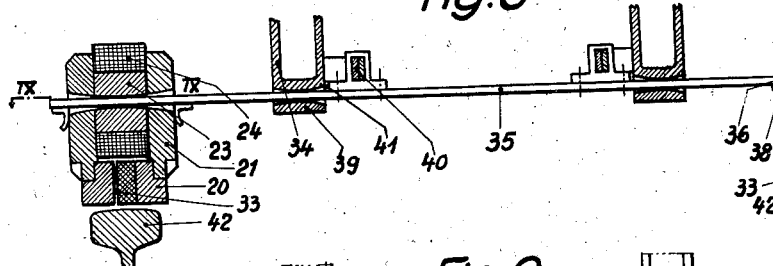
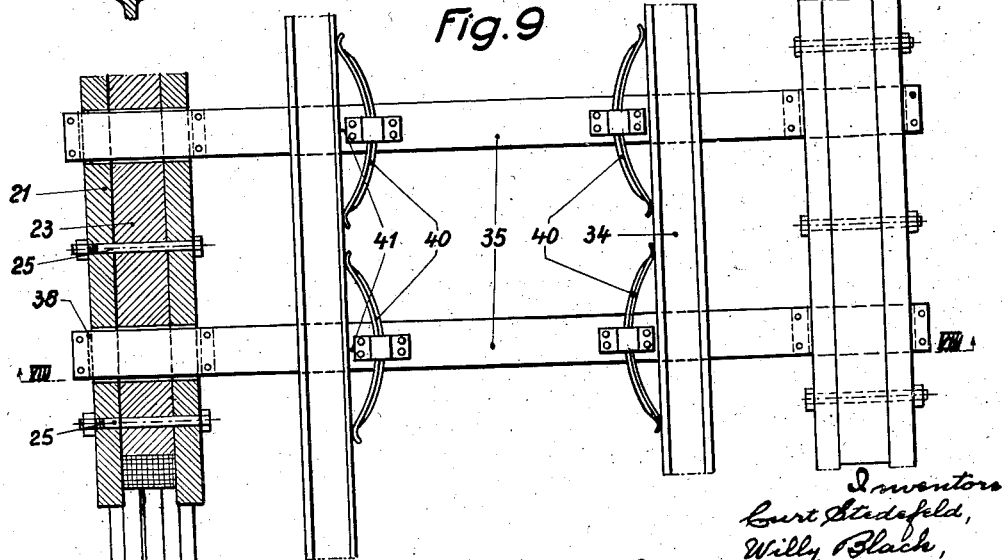

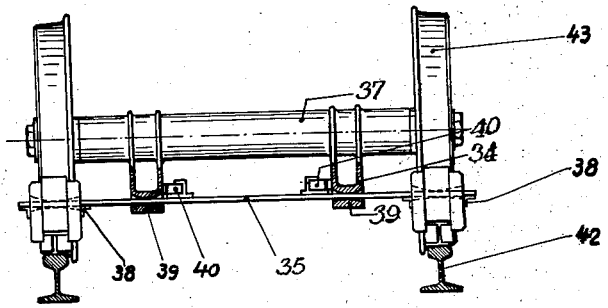
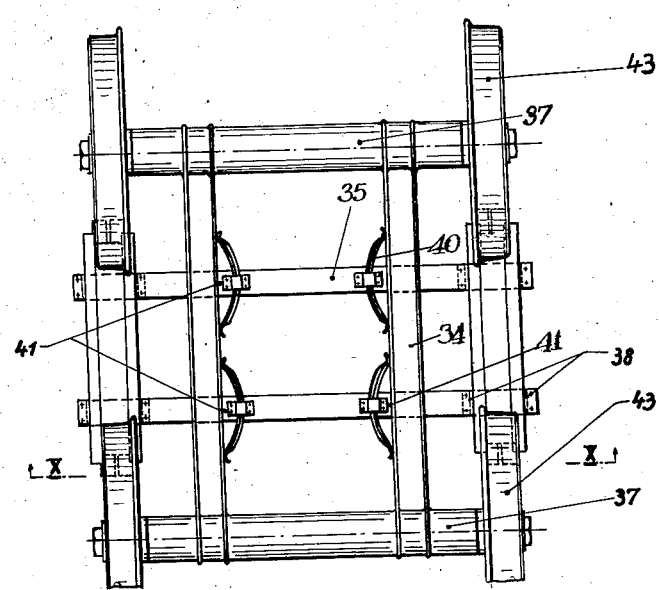
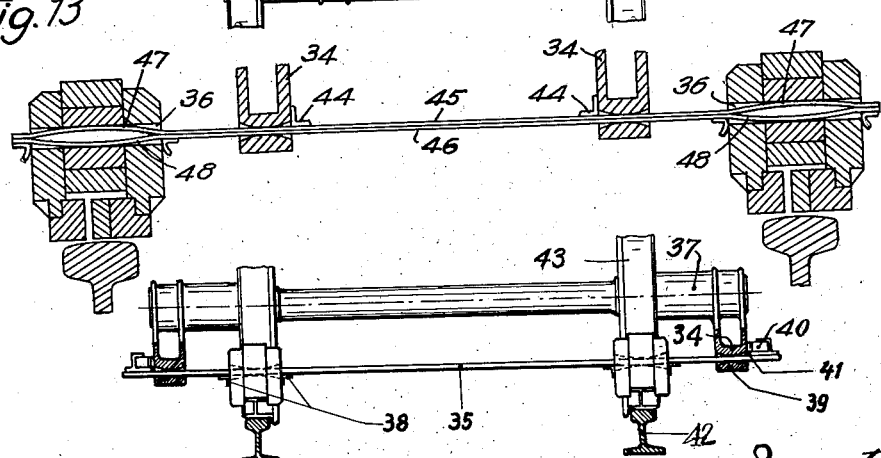

Patented Sept. 15, 1936

2,054,716

UNITED STATES PATENT OFFICE 2,054,716

ELECTROMAGNETIC RAIL BRAKE

Curt Stedefeld and Willy Black, Hanover, Germany; said Black assignor to said Stedefeld Application November 9, 1932, Serial No. 641,900
In Germany November 16, 1931

8 Claims. (Cl. 188—165)

The invention relates to electromagnetic rail brakes and more particularly to brakes of this character intended for high-speed railroads.

When electromagnetic rail brakes of the type now used for electric tramways and secondary railroads are applied to trunk line vehicles having high weights and speeds, troubles will soon arise from the sliding surfaces of the brake shoes being very substantially heated and from shocks being developed by the track. Heating increases in the same proportion as the momentum to be braked, that is the product of mass and the square of speed, while the effects of the shocks also increase in the same proportion as the square of the speed. Thus the two phenomena referred to will be quadrupled in the same vehicle when the speed thereof has been doubled.

The primary object of the invention is to provide brake shoes particularly intended for high-speed vehicles and which are characterized by substantial absence from the injurious effect of intense heating of the sliding surfaces.

Another object of the invention is to provide for a convenient system of fastening filling pieces between the brake shoes which prevents the said pieces from loosening under the action of shocks.

Another object of the invention is to provide for a novel system of arranging the whole magnetic brake set on the running gear so as to ensure low weight, high safety of operation and simplicity of construction.

Other objects will be in part apparent and in part pointed out hereafter.

In the drawings:

Fig. 1 is a side view of a brake magnet,

Fig. 2 is a cross sectional view of the same,

Fig. 3 is a side view of another embodiment of the invention,

Fig. 4 is a cross sectional view of the embodiment shown by Fig. 3,

Fig. 5 is a section through a single shoe such as shown in Figs. 1 and 2, the section being taken on line V—V of Fig. 7, Fig. 6 is a similar section on line VI—VI of Fig. 7, Fig. 7 is a detail side elevation of the single shoe as seen when looking in the direction of the arrow VII—VII of Fig. 5.

Fig. 8 is a longitudinal section taken on line 8—8 of Fig. 9 and shows how the brake magnets are mounted as a whole on the running gear, Fig. 9 is a top plan view of the braking set, partly in section on line 9—9 of Fig. 8, Fig. 10 is a cross sectional view of the whole braking set as taken on line 10—10 of Fig. 11, Fig. 11 is a top plan view of the whole braking set, while Fig. 12 shows how the braking system is adapted to vehicles provided with outside axle boxes.

Fig. 13 is a sectional view showing a modified structure for mounting the brake magnets on the running gear.

The invention relates exclusively to electromagnetic rail brakes of the kind in which each magnet has only two brake shoes arranged side by side along the length of the rail, the magnetic lines of force flowing transversely through the rail. As is known the brake shoes are thus long beams of moderate height. When the said shoes are substantially heated by their braking work on the sliding underside, they will warp, as the underside expands while the top of the shoe remains cooler. In this way the beam will bend so as to be convex on the underside. This will result in the middle part being ground off so that, when braking has ceased, the top of the shoe will be concave and the underside straight as ground by the rail. After having cooled down the bottom fibers will contract again and finally the shoe will show an underside sensibly concave while the top results feebly convex. The fastening bolts which connect the shoe to the magnet yokes are not able to stand the very heavy strain so exerted by the thermic dilation, but will be bent or partially sheared. Much worse, however, is the comparatively excessive wear of the brake shoes which will, when braking starts, at first bear against the rail with their extreme ends only while later the center thereof will project excessively. Moreover the magnetic attraction will not be fully effective in the beginning on account of the underside of the shoe being concave in that instant.

In contrast to the usual construction, the magnetic brake shoe of each magnet pole is, according to the present invention, not made in one piece but separated into several short lengths, such as 20', 20'', 20''' and 20'''' (Fig. 1). Each of these pieces is individually fastened by bolts 22 to the magnet yokes 21, the brakes shoes being of approximately L-shaped cross-section and the magnetic yokes being cut back somewhat along their opposed inner faces to provide seats for receiving the vertical legs of the L-shaped brake shoes. The brake shoes or brake shoe sections are attached to the magnetic yoke by inserting the shoes, with their longer vertical surfaces adjacent each other, into the gap between the opposed pole pieces and then passing the bolts 22 through the pole pieces, from their outer sides, and threading the same into the brake shoes. In this way the bending of the sliding surfaces can only be very slight after the said pieces having been warmed up, as with the same cross section and the same amount of heating acting on the underside, the camber of these partial beams is inversely proportional to the square of the length so that in the case of four parts the camber of each is only $\frac{1}{16}$ of that of the continuous shoe of the previous system. In this way also the bending stress of the bolts 22 is kept within harmless limits. As for the rest, the construction of the braking magnet in respect to the core 23 and the coil 24 may be as usual, the core 23 and the yoke 21 being held together by the bolt 25 after the coil 24 has been drawn over.

Another embodiment of the same inventive idea is shown in Figs. 3 and 4. In this instance either brake shoe 20 is made in one piece but it is provided with vertical slots 26', 26'' and 26''' on the underside. These slots extend upwards somewhat more than the admissible wear of the shoe but still as far only as the existence of a sufficiently stiff bridge between the several portions of the brake shoe will permit. The effect of the slots 26 is even somewhat better since the short beams extending between two adjacent slots do not behave, viz. warp, like a "beam on two supports" as those shown by Figs. 1 and 2, but as "fixed beams", and at the ends of the shoe as "unilaterally fixed beams", it is true. So the camber of the sliding surface and the additional wear therefrom resulting will be even less than in the sectional brake shoe of Figs. 1 and 2.

According to the invention, the strain on the fastening bolts 22 can be further reduced without materially increasing the difficulties or expense of manufacture and assembly by undercutting the inner surface of the vertical leg of each approximately L-shaped brake shoe to provide a longitudinal tongue 27 of rectangular cross-section which is snugly received within a correspondingly shaped longitudinal groove at the inner vertical face of the magnet yoke 21, as is shown in Figs. 3 and 4. The brake shoes may be readily attached to the yoke in the same manner as the simpler brake shoes of L-shaped cross-section, but, with this preferred construction, the brake shoes are restrained from warping upwardly or downwardly with respect to the magnetic yoke. To obtain this result a substantially exact fit should be provided for at the three faces marked 44, 45 and 46 in the said figures, as a perfect contact of these faces is decisive for the low resistance to the magnetic flux from yoke 21 to brake shoe 20; any minute air-gap there would sensibly decrease the magnetic attraction and the braking effect.

In the case of high travelling speeds the brake shoe is, by irregularities of the track or foreign matter thereon, much more jeopardized than in the case of the speeds usual in tramway service. A drawback in this connection is the gap 28 (Fig. 4) between the two pole pieces 20 which must not be filled out with iron and so magnetically "short-circuited". In this gap pebbles etc. may easily be clamped, particularly at high speeds. So far, it has been tried to fill out this gap by a non-magnetic filling piece. But the fastening of such an intermediate piece was either poor or too intricate for an easy replacement of the shoes 20, since it is not practical to simply clamp the filling piece between the shoes 20 by means of a through-bolt 22 as this requires an extremely accurate fit between the parts 23, 21, 20 and the filling piece.

These difficulties have been fully avoided by the novel system of fastening the intermediate pieces 29 as shown by Figs. 2, 5, 6 and 7. In this case the intermediate pieces 29 have the form of parallel strips which are divided longitudinally into sections that are secured to the sections 20', 20'', etc. of the brake shoes 20 so as to form unitary shoe-filler sections which may be stored ready for replacement. The adjacent faces of the pair of filler strips 29 are spaced apart by a small gap 33 which extends down the center of the brake shoes, but this gap is of such small size as to present no difficulties in the operation of the brake system. The said figures show how a filling piece 29, four of which would be necessary for a whole brake shoe length (see Fig. 1), is fastened by means of non-magnetic copper rivets or the like to the brake shoe 20 which in turn is provided with the usual threaded holes 31 for the fastening bolts 22. In order that the riveted connection 30 is released from any vertical or horizontal shearing forces existing between the filling piece 29 and the shoe 20 as a consequence of the pressure acting on the rail, the filling piece may conveniently be provided with stamped or cast projections 32 to be fitted into holes of the shoes 20. When for instance the filling pieces 29 are made, with a view to an increase of friction, of a pressed asbestos material as used for brake lining in automobiles, the projections 32 may be fitted with precision. Naturally, there is no necessity for employing the pair of filling pieces 29, as shown in Fig. 2, since a single piece 29 of such width as to extend across practically the entire gap 28, may be secured to only one of the two shoes 20 or alternately to one and another shoe portion so that, seen from below, they are staggered. That in this arrangement of the filling pieces (Fig. 8) of about the full gap width the small remaining gap 33 is not in the center, as Fig. 2 shows, but laterally, is immaterial for the service.

The novel system of fastening the brake magnet set 20 to 24 as a whole on the running gear 34 is shown in Figs. 8 to 11, while Fig. 12 shows an arrangement for outside axle boxes. The fastening system must comply with a number of requirements at the same time: The weight of the braking magnets must be so carried that the braking surfaces hang with small clearance and exact gage above the rails; there must be a definite vertical spring action which is overcome by the attraction of the magnets towards the rails, when the said magnets are switched-in, but without allowing of the brakes being caused to slide on the rails by the vibrations during the travel; finally the braking forces acting in a lengthwise direction must be safely transmitted to the vehicle. When all these requirements are to be met individually by special structural members, as was usual so far, the arrangement results heavy and intricate so that it is little suited for light high-speed vehicles subject to heavy shocks in the running. The present invention makes use of the same structural members for meeting any of the above requirements, namely: simple plate springs 35 arranged transversely so as to connect the two sides of the vehicle. Each braking magnet is provided with two cross openings 36 extending through the yokes 21 and the core 23 and which are intended for carrying the magnets on their ends. The plate spring systems 35 are in turn carried by the running gear members 34 in two places and there secured against transverse displacements. In the instance shown and representing a four-wheeled running gear, the said members 34 are two longitudinals extending from one axle box 37 to the other, the longitudinals being susceptible to a slight torsion to allow for those small departures of the axles from exactly parallel arrangement as may be caused by irregularities of the tracks. In the case of running gears with inside axle boxes, as in Figs. 8 to 11, the said longitudinals are disposed internally and in the case of running gears with outside axle boxes, as in Fig. 12, they are arranged on the outside.

In order to prevent the magnets 20 to 24 from displacing transversely, angular stops 38 are provided, those on the inside being riveted and on the outside screwed to the plate spring 35 so that the magnets can be readily removed. In this way the exact gage is ensured between the two magnets. Moreover the latter are given the possibility of adapting themselves to any cant of the rails during braking as the openings 36 are tapered outwards. The same applies to the bearing surfaces 39 of the longitudinals 34 of the running gear. In these bearing blocks the plate spring system 35 can be secured against transverse displacement either by angular stop 38 or 44 the same as the magnets or a slight transverse displacement may be provided for against springs 40 preliminarily stressed and as far as fixed stops 41 permit. Such a transverse displacement in respect to the wheels 43, of the magnets following the rails 42 may be of advantage in the case of substantial play of the wheels subject to lateral shocks, of a passage through sharp curves or the like. In the lengthwise direction however the plate spring systems 35 must transmit the braking force of the magnets to the running gear and thus to the body of the vehicle and therefore in this direction no clearance is admissible in the openings 36 of the magnets and in the bearing blocks 39.

In this way the mounting of the magnets is at the same time rendered rigid in the running direction, stiff as to the gage in the transverse direction, slightly yielding across as to the common displacement of the magnets and in the vertical plane the spring action is, on account of the large springy length, well adjustable between a sufficient elasticity for attraction and a sufficient stiffness for preventing the magnets from touching the track when not switched in and subject to shocks produced by the track. These requirements will in many instances be met by simple plate springs of comparatively large width. Just as well laminated springs 45, 46 may be used when this is desirable in order to obtain the required combination of attraction, transmission of the braking force and stiffness for maintaining the correct gage as shown in Fig. 13. In this case the openings 36 of the magnets may be left without taper and the curved form necessary for the slanting position required may be provided for at the ends 47, 48 of the spring.

What we claim is:—

1. In an electromagnetic rail brake, particularly for high-speed railways, including a pair of brake magnets, one over each rail, mounting means including plate spring members positioned on the running gear transverse to the track and having the brake magnets mounted adjacent the ends thereof over the rails whereby the magnets are maintained in the correct gage and the braking forces are transmitted to the running gear.

2. Mounting means for electromagnetic rail brakes as defined in claim 1 wherein the plate spring members extend through openings in the magnet bodies.

3. Mounting means for electromagnetic rail brakes as defined in claim 1 wherein the attachment of the plate spring members to the running gear includes resilient members limited by stops adapted to permit a limited transverse displacement of said plate spring members.

4. An electromagnetic rail brake adapted for use on high-speed railways comprising a yoke, a coil on said yoke, said yoke terminating in parallel pole pieces adapted to extend longitudinally of a rail, and magnetic brake shoes arranged side by side and secured to the respective pole pieces for engagement with laterally spaced portions of a rail, the braking surfaces of said brake shoes being subdivided into a plurality of longitudinal sections spaced apart by narrow transverse slots, whereby warping of the brake shoes by frictional heat is substantially prevented.

5. An electromagnetic rail brake as claimed in claim 4, wherein each magnetic brake shoe secured to said pole pieces comprises a unitary member having an upper portion extending over and integral with the plurality of longitudinal sections into which the lower portion of the brake shoe is divided by said transverse slots, the transverse slots of the lower portion extending upwardly at least as far as the point of maximum wear and the said upper portion having a depth providing resistance against bending.

6. An electromagnetic rail brake adapted for use on high-speed railways comprising a yoke terminating in a pair of parallel pole pieces adapted to extend along a rail, the vertical surfaces of said pole pieces being each provided with a longitudinal groove of rectangular cross-section, and a brake shoe of approximately L-shaped cross-section secured to and seated against the end and the grooved vertical surface of each pole piece, the vertical leg of each brake shoe having a longitudinal tongue snugly fitting within the groove of the corresponding pole piece.

7. An electromagnetic rail brake as claimed in claim 6, wherein the opposed inner surfaces of said pole pieces are grooved, and the vertical legs of the L-shaped brake shoes lie within the space between the said poles, the lower legs of the brake shoes underlying the respective pole pieces.

8. An electromagnetic rail brake as claimed in claim 4, wherein each of said brake shoes comprises a plurality of separate brake shoe sections, the upper portions of the several sections being individually secured to the associated yoke and the lower portions of the sections of each shoe being longitudinally spaced to provide the said narrow transverse slots.

CURT STEDEFELD.
WILLY BLACK.